(12) United States Patent
Rycroft

(10) Patent No.: US 10,155,514 B2
(45) Date of Patent: Dec. 18, 2018

(54) CONTROL SYSTEM AND METHOD FOR IMPROVING VEHICLE TURNING PERFORMANCE

(71) Applicant: Jaguar Land Rover Limited, Whitley, Coventry, Warwickshire (GB)

(72) Inventor: Edward Rycroft, Southam (GB)

(73) Assignee: Jaguar Land Rover Limited, Whitley, Coventry (GB)

( * ) Notice: Subject to any disclaimer, the term of this patent is extended or adjusted under 35 U.S.C. 154(b) by 14 days.

(21) Appl. No.: 15/106,077

(22) PCT Filed: Dec. 8, 2014

(86) PCT No.: PCT/EP2014/076864
§ 371 (c)(1),
(2) Date: Jun. 17, 2016

(87) PCT Pub. No.: WO2015/091051
PCT Pub. Date: Jun. 25, 2015

(65) Prior Publication Data
US 2016/0318509 A1 Nov. 3, 2016

(30) Foreign Application Priority Data
Dec. 17, 2013 (GB) .................................. 1322336.7

(51) Int. Cl.
*B60W 30/045* (2012.01)
*B60T 8/1755* (2006.01)
(Continued)

(52) U.S. Cl.
CPC ......... *B60W 30/045* (2013.01); *B60T 8/1755* (2013.01); *B60K 31/00* (2013.01);
(Continued)

(58) Field of Classification Search
CPC .. B60W 30/045; B60T 8/1755; B60T 2201/16
See application file for complete search history.

(56) References Cited

U.S. PATENT DOCUMENTS 7,529,600 B2 * 5/2009 Mori ...................... B60T 8/1755
701/1
7,949,455 B2 * 5/2011 Kamikado ............ B60T 8/1755
303/146
(Continued)

FOREIGN PATENT DOCUMENTS

DE 4224887 A1 9/1993
DE 102007043599 A1 3/2009
(Continued)

OTHER PUBLICATIONS

Combined Search and Examination Report corresponding to application No. GB1322336.7, dated Jul. 4, 2014, 10 pages.
(Continued)

*Primary Examiner* — Todd M Melton
(74) *Attorney, Agent, or Firm* — Reising Ehtington P.C.

(57) ABSTRACT

A control system for a motor vehicle that operates to receive a signal indicative of a steering angle of a vehicle and cause application of negative torque to one or more wheels of a vehicle to slow a wheel. The system is configured to perform a turn-assist operation in which the system causes application of negative torque to at least a first wheel of a vehicle being an inside trailing wheel when a steering angle exceeds a predetermined steering angle thereby to promote turning of a vehicle. The amount of negative torque is arranged to increase with increasing steering angle beyond the predetermined steering angle.

26 Claims, 8 Drawing Sheets

(51) Int. Cl.
*B60K 31/00* (2006.01)
*F16H 59/02* (2006.01)

(52) U.S. Cl.
CPC ....... *B60T 2201/04* (2013.01); *B60T 2210/16* (2013.01); *B60T 2210/22* (2013.01); *B60W 2520/10* (2013.01); *B60W 2520/28* (2013.01); *B60W 2540/18* (2013.01); *B60W 2550/148* (2013.01); *B60W 2710/182* (2013.01); *B60W 2720/406* (2013.01); *B60Y 2300/82* (2013.01); *F16H 59/02* (2013.01); *F16H 2059/0221* (2013.01)

(56) References Cited

U.S. PATENT DOCUMENTS

| | | | | |
|---|---|---|---|---|
| 8,989,964 | B2* | 3/2015 | Yasui | B62D 11/003 180/197 |
| 9,199,639 | B2* | 12/2015 | Yamakado | B60T 8/1755 |
| 2002/0060103 | A1 | 5/2002 | Ritz et al. | |
| 2008/0262689 | A1 | 10/2008 | Sayers et al. | |
| 2010/0174463 | A1* | 7/2010 | Uragami | B60T 8/1755 701/70 |
| 2012/0253625 | A1 | 10/2012 | Canuto et al. | |
| 2013/0013151 | A1 | 1/2013 | Schafiyha et al. | |
| 2014/0195123 | A1 | 7/2014 | Nishikawa et al. | |

FOREIGN PATENT DOCUMENTS

| | | |
|---|---|---|
| EP | 1982897 A1 | 10/2008 |
| EP | 2746125 A1 | 6/2014 |
| GB | 2412100 A | 9/2005 |
| JP | 2009154598 A | 7/2009 |
| WO | WO2013027573 A1 | 2/2013 |

OTHER PUBLICATIONS

International Search Report corresponding to International application No. PCT/EP2014/076864, dated Mar. 10, 2015, 6 pages.
Written Opinion corresponding to International application No. PCT/EP2014/076864, dated Mar. 10, 2015, 6 pages.
Combined Search and Examination Report corresponding to application No. GB1421766.5, dated May 20, 2015, 8 pages.

* cited by examiner

CONTROL SYSTEM AND METHOD FOR IMPROVING VEHICLE TURNING PERFORMANCE

FIELD OF THE INVENTION

The invention relates to a system for controlling a vehicle. In particular, but not exclusively, the invention relates to a system for controlling a land-based vehicle to improve turning performance. More particularly but not exclusively embodiments of the present invention relate to improving turning performance in a vehicle capable of driving in a variety of different and extreme terrains and conditions.

The content of co-pending GB1314727.2 and U.S. Pat. No. 7,349,776 is hereby incorporated by reference.

BACKGROUND

It is known to provide vehicles suitable for driving in off-road conditions as well as on conventional roads including highways, such as four wheeled vehicles that are configured to drive all four wheels by means of a powertrain.

In certain situations such as when maneuvering at low speeds in off-road conditions, it is desirable to reduce a turning circle of a vehicle below that which the vehicle is otherwise capable of achieving. Vehicle turning circle can increase in certain off-road conditions due to understeer, which can be exacerbate on surfaces of relatively low surface coefficient of friction ('surface mu').

In one known vehicle, when a driver turns a steering wheel through greater than 270° to the left or right of a straight-ahead steering wheel position, full brake pressure is applied to an inside rear wheel in order to induce turning of the vehicle in the intended direction with a reduced turning circle.

It is also known to provide a control system for a motor vehicle for controlling one or more vehicle subsystems. U.S. Pat. No. 7,349,776 discloses a vehicle control system comprising a plurality of subsystem controllers including an engine management system, a transmission controller, a steering controller, a brakes controller and a suspension controller. The subsystem controllers are each operable in a plurality of subsystem function or configuration modes. The subsystem controllers are connected to a vehicle mode controller which controls the subsystem controllers to assume a required configuration mode so as to provide a number of driving modes for the vehicle. Each of the driving modes corresponds to a particular driving condition or set of driving conditions, and in each mode each of the subsystems is set to the function mode most appropriate to those conditions. Such conditions are linked to types of terrain over which the vehicle may be driven such as grass/gravel/snow, mud and ruts, rock crawl, sand and a highway mode known as 'special programs off' (SPO). The vehicle mode controller may be referred to as a Terrain Response (TR) (RTM) System or controller. The driving modes may also be referred to as terrain modes, terrain response modes, or control modes.

SUMMARY OF THE INVENTION

Embodiments of the invention may be understood with reference to the appended claims.

Aspects of the present invention provide a system, a vehicle and a method.

In one aspect of the invention for which protection is sought there is provided a vehicle control system comprising a control system for a motor vehicle comprising: means for receiving a signal indicative of a steering angle of a vehicle; and means for causing application of negative torque to one or more wheels of a vehicle to slow a wheel; the system being configured to perform a turn-assist operation in which the system causes application of negative torque to at least a first wheel of a vehicle being an inside trailing wheel when a steering angle exceeds a predetermined steering angle thereby to promote turning of a vehicle, the amount of negative torque being arranged to increase with increasing steering angle beyond the predetermined steering angle.

Embodiments of the present invention have the advantage that a turn radius of a vehicle may be reduced in a manner that is intuitive to a driver. Some embodiments of the invention allow vehicle composure to be maintained when cornering in off-road driving conditions.

This is in contrast to known steering assistance systems which apply full brake force to an inside wheel once steering angle exceeds a predetermined amount. This can result in an increase in noise, vibration and harshness (NVH) associated with vehicle operations. In addition or instead this may cause substantial degradation to a driving surface. Alternatively the known systems may apply a maximum possible braking force without incurring excessive wheel slip. Such a system will also transition between not applying any brake force to applying maximum allowable braking force once the steering angle exceeds a predetermined amount.

The system may further comprise means for causing application of positive drive torque to one or more wheels of a vehicle, the system being configured to cause an increase in an amount of net torque applied to at least a second wheel of a vehicle to compensate for application of negative torque to at least a first wheel when a turn-assist operation is in progress.

This feature has the advantage that an amount of a decrease in vehicle speed due to application of negative torque to at least a first inside wheel when the turn-assist operation is performed may be reduced or substantially prevented. This may have the benefit of increasing vehicle composure and reducing driver workload. That is, the driver may not need to compensate for the application of negative torque by increasing the amount of demanded powertrain torque when the steering angle exceeds the predetermined steering angle.

The system may further comprise means for receiving a signal indicative of a speed of a vehicle, the system being configured to adjust the amount of negative torque applied to said at least a first wheel in dependence on vehicle speed when a turn-assist operation is in progress.

The system may be configured to reduce the amount of negative torque applied to said at least a first wheel as vehicle speed increases when a turn-assist operation is in progress.

Thus as speed increases the system may reduce the amount of negative torque intervention to promote turning, allowing the vehicle to respond to the driver desire to increase vehicle speed which may take priority over a driver's desire to achieve a relatively low turn radius.

The system may be configured not to perform a turn-assist operation when vehicle speed is less than a lower threshold predetermined speed or when vehicle speed is greater than an upper threshold predetermined speed.

The system may be arranged to receive a signal indicative of driver demanded torque, the system being configured to adjust the amount of negative torque applied to said at least a first wheel in dependence on driver demanded torque when a turn-assist operation is in progress.

The signal indicative of driver demanded torque may be a signal indicative of an accelerator pedal position. Alternatively the signal indicative of driver demanded torque may be a signal indicative of an amount of torque that a powertrain controller or the like is being commanded to cause a powertrain to develop, optionally that prime mover means of a powertrain is being commanded to develop. The prime mover means may comprise an engine and/or an electric machine.

The system may be configured to reduce the amount of negative torque applied to said at least a first wheel being an inside wheel as driver demanded torque increases when a turn-assist operation is in progress.

The system may be configured not to perform a turn-assist operation when driver torque demand is less than a predetermined lower threshold torque demand value or when driver torque demand is greater than a predetermined upper threshold torque demand value.

The system may be configured to allow a turn-assist operation to be performed in dependence on a user-selection signal created in response to user selection of a turn-assist mode of operation.

The user-selection signal may be generated by a user by means of a physical selector button, knob or the like, by means of a touch screen or by any suitable means.

The signal may be generated by setting a flag or variable to a prescribed state, value or other indication in dependence on user input, the system being configured to allow a turn-assist operation to be performed in dependence on the state, value or other indication of the flag or variable. It is to be understood that the system may be configured to disallow a turn-assist operation from being performed in dependence on the user-selection signal.

The system may comprise means for determining a control mode in which a vehicle is operating.

The system may be configured, in dependence on the control mode in which a vehicle is operating, to set at least one of: the predetermined steering angle; the predetermined lower threshold speed; the predetermined upper threshold speed; the predetermined lower threshold torque demand value; the predetermined upper threshold torque demand value.

The system may be configured to receive information indicative of a surface coefficient of friction between a driving surface and one or more wheels, the system being configured to set an upper limit negative_torque_lim to the magnitude of the amount of negative torque that may be applied to an inside trailing wheel as a consequence of a turn-assist operation is being performed in dependence on the information.

The upper limit may be an upper limit to the total amount of negative torque that may be applied to an inside wheel when a turn-assist operation is being performed, including any negative brake torque commanded by a user via a brake pedal or by a speed control system, for example to maintain a target speed associated with the speed control system.

The system may be configured wherein the upper limit negative_torque_lim is an upper limit to a total amount of negative torque that may be applied to an inside trailing wheel when a turn-assist operation is performed.

The system may be configured wherein the upper limit negative_torque_lim is an upper limit of an amount of negative torque that is in addition to any negative torque applied other than as part of a turn-assist operation.

Thus, if a driver or a speed control system causes application of negative torque such as by means of a braking system, the system may set a value of negative_torque_lim as a limit to the amount negative torque that may be applied to induce turning in addition to negative torque applied to induce braking.

The means for causing application of negative torque to one or more wheels of a vehicle to slow a wheel comprises means for causing a braking system to apply negative torque to one or more wheels.

The system may comprise a data processing apparatus, the data processing apparatus being configured to receive the signal indicative of a steering angle of a vehicle, the data processing apparatus being further configured to cause the application of negative torque to one or more wheels.

The system may comprise a speed control system operable to cause a vehicle to operate in accordance with a target speed value by controlling an amount of brake torque applied by a braking system and an amount of drive torque applied by a powertrain to one or more wheels of the vehicle.

In some embodiments, if the brake controller is receiving a primary brake signal requesting or commanding application of a braking system to slow the vehicle and a turn-assist signal requesting or commanding application of braking as part of turn-assist operation, the system is configured to maintain an increased amount of brake torque to the at least one inside wheel in accordance with the turn-assist operation, the total amount of brake torque applied to the at least one inside wheel being dependent on the amount of braking required according to the primary brake signal. The LSSA function is configured to maintain an increased amount of braking to the at least one inside wheel relative to the amount that would have been applied if the LSSA function was not causing application of brake torque to promote turning. This feature has the advantage that a driver may enjoy the benefit of a reduced turning circle even under conditions in which a driver is depressing a brake pedal in order to slow the vehicle, for example when idle creep speed is too high for the prevailing driving conditions, or when descending an incline.

In a further aspect of the invention for which protection is sought there is provided a motor vehicle comprising a control system according to another aspect of the invention.

In an aspect of the invention for which protection is sought there is provided a method of controlling a motor vehicle implemented by means of a control system comprising: receiving a signal indicative of a steering angle of a vehicle; and performing a turn-assist operation, performing a turn-assist operation comprising causing application of negative torque to at least a first wheel of a vehicle being an inside trailing wheel when a steering angle exceeds a predetermined steering angle thereby to promote turning of a vehicle, the method comprising increasing the amount of brake torque with increasing steering angle beyond the predetermined steering angle.

The method may comprise: applying positive drive torque to one or more wheels of a vehicle, and increasing an amount of net torque applied to at least a second wheel of a vehicle to compensate for application of negative torque to said at least a first wheel when a turn-assist operation is in progress.

Alternatively or in addition the method may comprise: receiving a signal indicative of a speed of a vehicle; and reducing the amount of negative torque applied to said at least a first wheel as said vehicle speed increases when a turn-assist operation is in progress.

Alternatively or in addition the method may comprise: receiving a signal indicative of driver demanded torque; and reducing the amount of negative torque applied to said at least a first wheel as driver demanded torque increases, when a turn-assist operation is in progress.

Alternatively or in addition the method may comprise: determining a control mode in which a vehicle is operating, and in dependence thereon setting at least one of: the predetermined steering angle; the predetermined lower threshold speed; the predetermined upper threshold speed; the predetermined lower threshold torque demand value; the predetermined upper threshold torque demand value.

The method may comprise: receiving information indicative of a surface coefficient of friction between a driving surface and one or more wheels; and setting an upper limit negative_torque_lim to the magnitude of the amount of negative torque that may be applied to an inside trailing wheel as a consequence of a turn-assist operation is being performed in dependence on the information.

The method may comprise setting the upper limit negative_torque_lim as the limit to the total amount of negative torque that may be applied to an inside trailing wheel when a turn-assist operation is performed.

Alternatively the method may comprise setting the upper limit negative_torque_lim as the limit of the amount of negative torque that may be applied that is in addition to any negative torque applied other than as part of a turn-assist operation.

In one aspect of the invention for which protection is sought there is provided a computer program product executable on a processor so as to implement a method according to the preceding aspect.

In an aspect of the invention for which protection is sought there is provided a computer readable medium loaded with a computer program product according to the preceding aspect.

In a further aspect of the invention for which protection is sought there is provided a processor arranged to implement the method of a preceding aspect, or execute the computer program product of a preceding aspect.

In one aspect of the invention for which protection is sought there is provided a carrier medium carrying computer readable code for controlling a vehicle to carry out a method according to an aspect of the present invention.

It is to be understood that the computer readable code may be suitable for execution by a microprocessor of a vehicle in order to cause the vehicle to operate according to a method according to an aspect of the present invention. The computer readable code may be stored in a memory of a controller of the vehicle such as a solid state memory or any other suitable memory.

Some embodiments of the present invention provide a control system for a motor vehicle comprising means for receiving a signal indicative of a steering angle of a vehicle and means for causing application of negative torque to one or more wheels of a vehicle to slow a wheel. The system may be configured to perform a turn-assist operation in which the system causes application of negative torque to at least a first wheel of a vehicle being an inside trailing wheel when a steering angle exceeds a predetermined steering angle thereby to promote turning of a vehicle. The amount of negative torque may be arranged to increase with increasing steering angle beyond the predetermined steering angle. The amount of negative torque applied may be determined in dependence on vehicle speed when the turn-assist operation is performed. The amount of negative torque may be arranged to decrease with increasing vehicle speed. Some embodiments of the present invention permit a vehicle to cause reduced or no modification of a driving surface when driving over a relatively fragile surface such as grass.

Some embodiments of the present invention provide a control system for a motor vehicle comprising means for receiving a signal indicative of a steering angle of a vehicle and means for causing application of negative torque to one or more wheels of a vehicle to slow a wheel. The system may be configured to perform a turn-assist operation in which the system causes application of negative torque to at least a first wheel of a vehicle being an inside trailing wheel when a steering angle exceeds a predetermined steering angle thereby to promote turning of a vehicle. The amount of negative torque may be arranged to increase with increasing steering angle beyond the predetermined steering angle. Alternatively or in addition the amount of negative torque applied may be determined in dependence on vehicle speed when the turn-assist operation is performed.

Within the scope of this application it is expressly envisaged that the various aspects, embodiments, examples and alternatives set out in the preceding paragraphs, in the claims and/or in the following description and drawings, and in particular the individual features thereof, may be taken independently or in any combination. Features described in connection with one embodiment are applicable to all embodiments, unless such features are incompatible.

BRIEF DESCRIPTION OF THE DRAWINGS

The invention will now be described by way of example only with reference to the following figures in which.

DETAILED DESCRIPTION

Figure 1:
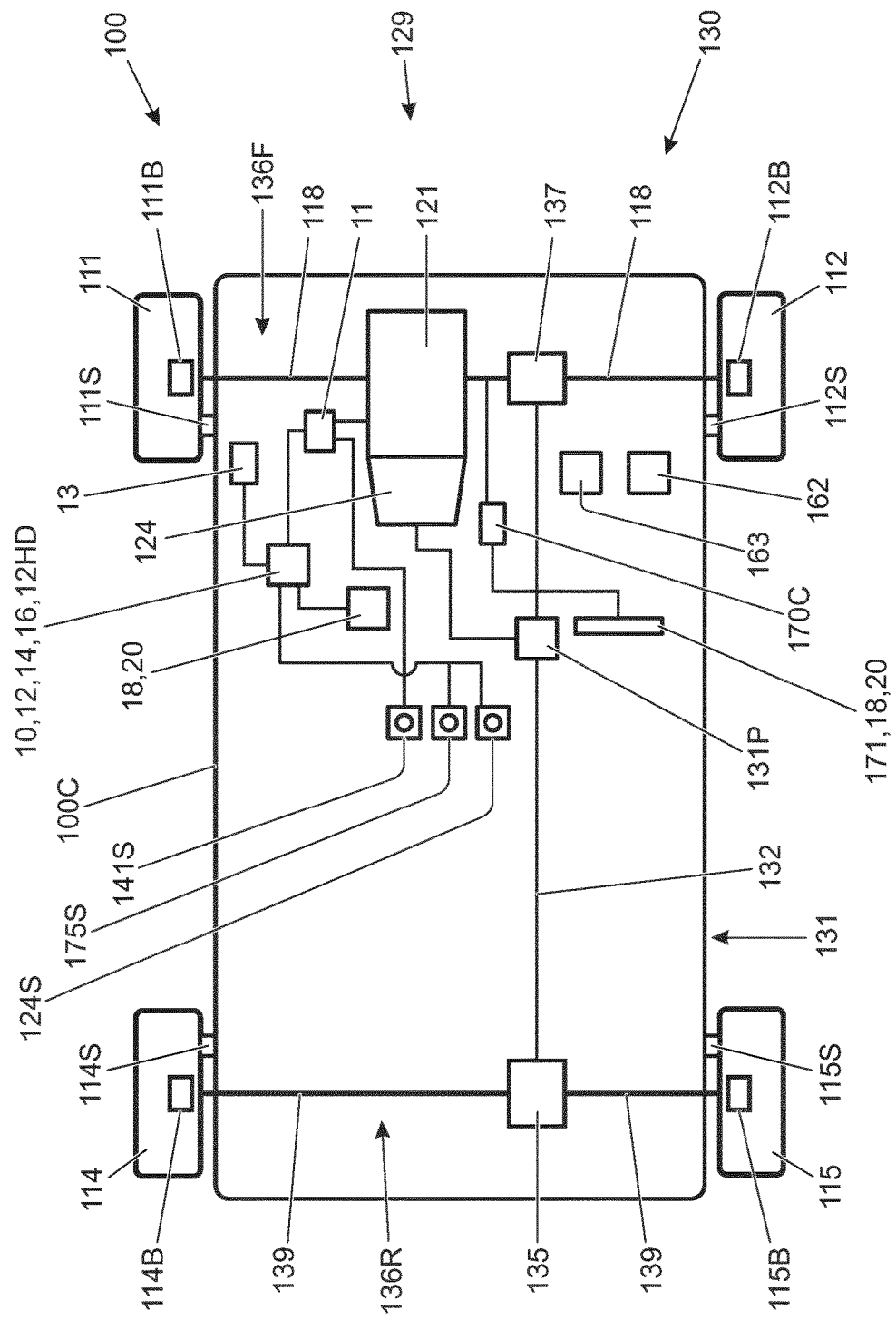
FIG. 1 is a schematic illustration of a vehicle according to an embodiment of the invention in plan view.
Figure 2:
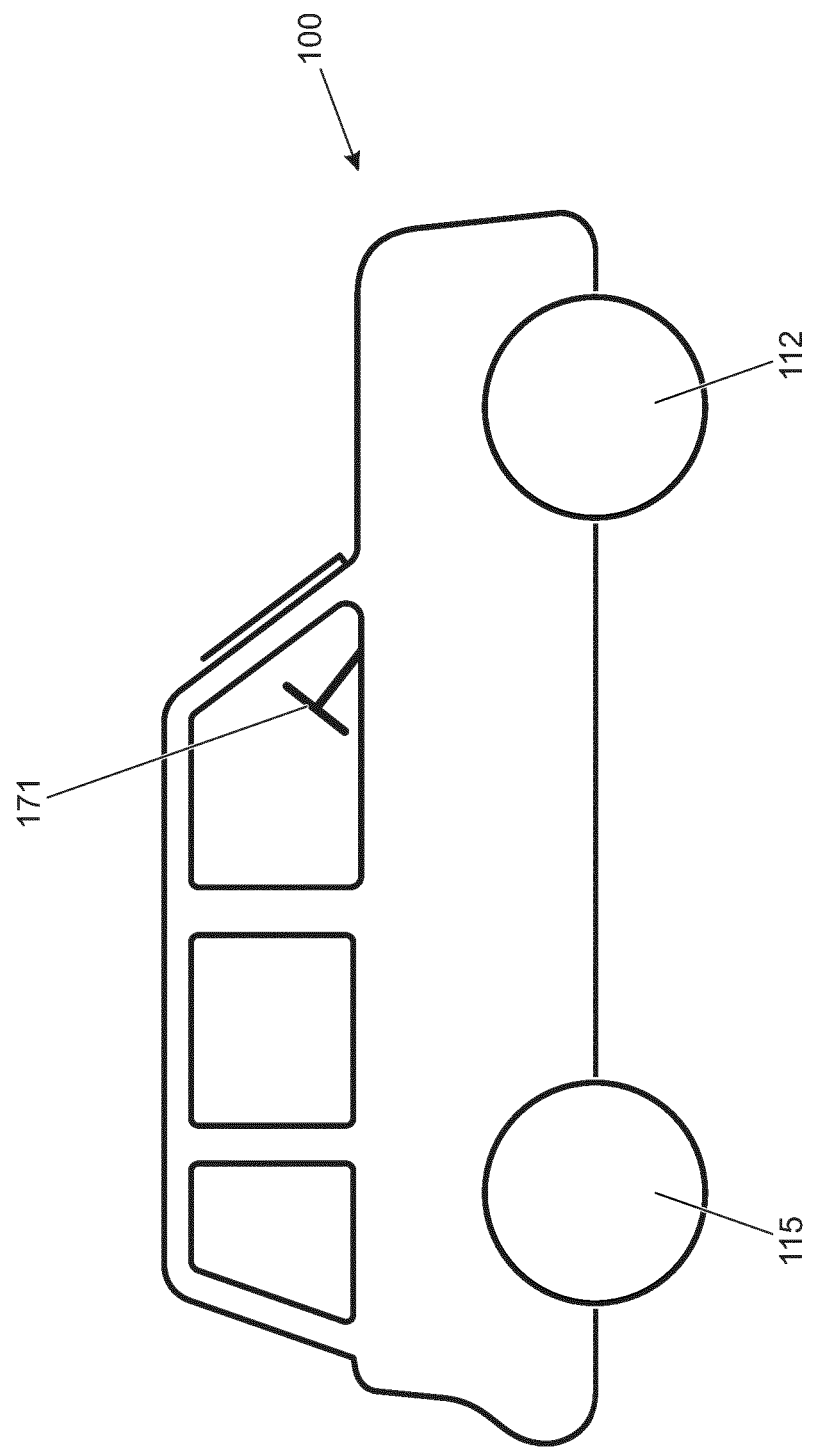
FIG. 2 shows the vehicle of FIG. 1 in side view.

FIG. 1 and FIG. 2 are schematic illustrations of a vehicle 100 according to an embodiment of the present invention. FIG. 1 is a schematic plan view showing a number of major components whilst FIG. 2 is a side view.

The vehicle 100 has a powertrain 129 that includes an engine 121 that is connected to a driveline 130 having an automatic transmission 124. It is to be understood that embodiments of the present invention are also suitable for use in vehicles with manual transmissions, continuously variable transmissions or any other suitable transmission.

In the embodiment of FIG. 1 the transmission 124 may be set to one of a plurality of transmission operating modes, being a park mode, a reverse mode, a neutral mode, a drive mode or a sport mode, by means of a transmission mode selector dial 124S. The selector dial 124S provides an output signal to a powertrain controller 11 in response to which the powertrain controller 11 causes the transmission 124 to operate in accordance with the selected transmission mode.

The driveline 130 is arranged to drive a pair of front vehicle wheels 111,112 by means of a front differential 137 and a pair of front drive shafts 118. The driveline 130 also comprises an auxiliary driveline portion 131 arranged to drive a pair of rear wheels 114, 115 by means of an auxiliary driveshaft or prop-shaft 132, a rear differential 135 and a pair of rear driveshafts 139. The front wheels 111, 112 in combination with the front drive shafts 118 and front differential 137 may be referred to as a front axle 136F. The rear wheels 114, 115 in combination with rear drive shafts 139 and rear differential 135 may be referred to as a rear axle 136R.

The wheels 111, 112, 114, 115 each have a respective brake 111B, 112B, 114B, 115B. Respective speed sensors 111S, 112S, 114S, 115S are associated with each wheel 111, 112, 114, 115 of the vehicle 100. The sensors 111S, 112S, 114S, 115S are mounted to a chassis 100C of the vehicle 100 and arranged to measure a speed of the corresponding wheel.

Embodiments of the present invention are suitable for use with vehicles in which the transmission 124 is arranged to drive only a pair of front wheels 111, 112 or only a pair of rear wheels 114, 115 (i.e. front wheel drive vehicles or rear wheel drive vehicles) or selectable two wheel drive/four wheel drive vehicles. In the embodiment of FIG. 1 the transmission 124 is releasably connectable to the auxiliary driveline portion 131 by means of a power transfer unit (PTU) 131P, allowing operation in a two wheel drive mode or a four wheel drive mode. It is to be understood that embodiments of the invention may be suitable for vehicles having more than four wheels or where only two wheels are driven, for example two wheels of a three wheeled vehicle or four wheeled vehicle or a vehicle with more than four wheels.

Figure 3:
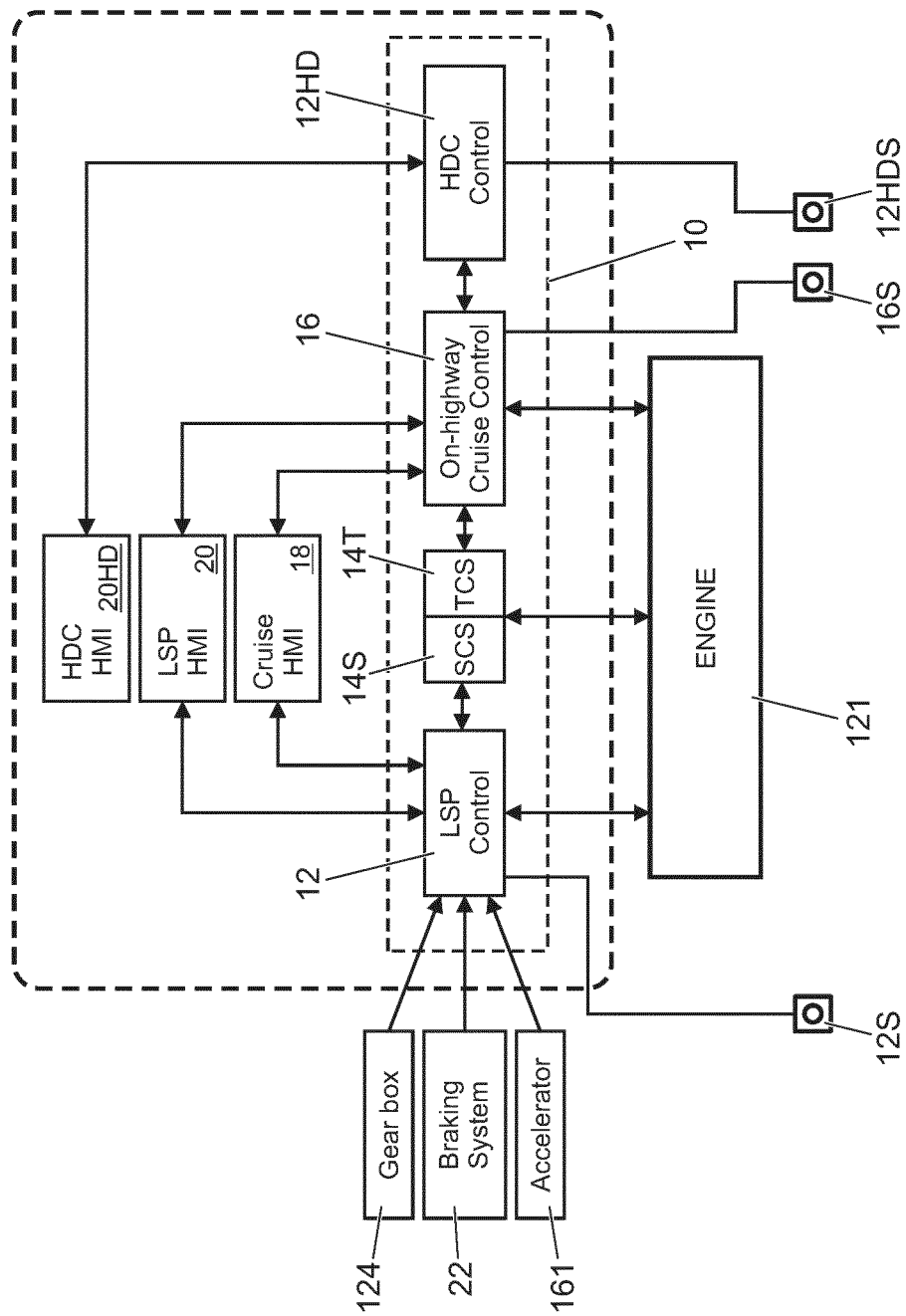
FIG. 3 is a high level schematic diagram of an embodiment of the vehicle speed control system of the present invention, including a cruise control system and a low-speed progress control system.

A control system for the vehicle includes a central controller 10 (FIG. 1 and FIG. 3), referred to as a vehicle control unit (VCU) 10, the powertrain controller 11, a brake controller 13 and a steering controller 170C. The brake controller 13 is an anti-lock braking system (ABS) controller 13 and forms part of a braking system 22 (FIG. 3). The VCU 10 receives and outputs a plurality of signals to and from various sensors and subsystems (not shown) provided on the vehicle 100. The VCU 10 includes a low-speed progress (LSP) control system 12 shown in FIG. 3, a stability control system (SCS) 14S, a traction control system (TCS) 14T, a cruise control system 16 and a Hill Descent Control (HDC) system 12HD. The SCS 14S improves stability of the vehicle 100 by detecting and managing loss of traction when cornering. When a reduction in steering control is detected, the SCS 14S is configured automatically to command the brake controller 13 to apply one or more brakes 111B, 112B, 114B, 115B of the vehicle 100 to counteract the loss of traction and assist in maintaining the vehicle 100 in the direction the user wishes to travel. If excessive wheel spin is detected, the TCS 14S is configured to reduce wheel spin by application of brake force in combination with a reduction in powertrain drive torque. In the embodiment shown the SCS 14S and TCS 14T are implemented by the VCU 10. In some alternative embodiments the SCS 14S and/or TCS 14T may be implemented by the brake controller 13. Further alternatively, the SCS 14S and/or TCS 14T may be implemented by separate controllers.

The SCS 14S, TCS 14T, ABS controller 13 and HDC system 12HD provide outputs indicative of, for example, SCS activity, TCS activity, ABS activity, brake interventions on individual wheels and engine torque requests from the VCU 10 to the engine 121 in the event a wheel slip event occurs. Each of the aforementioned events indicate that a wheel slip event has occurred. Other vehicle sub-systems such as a roll stability control system or the like may also be present.

Figure 4:
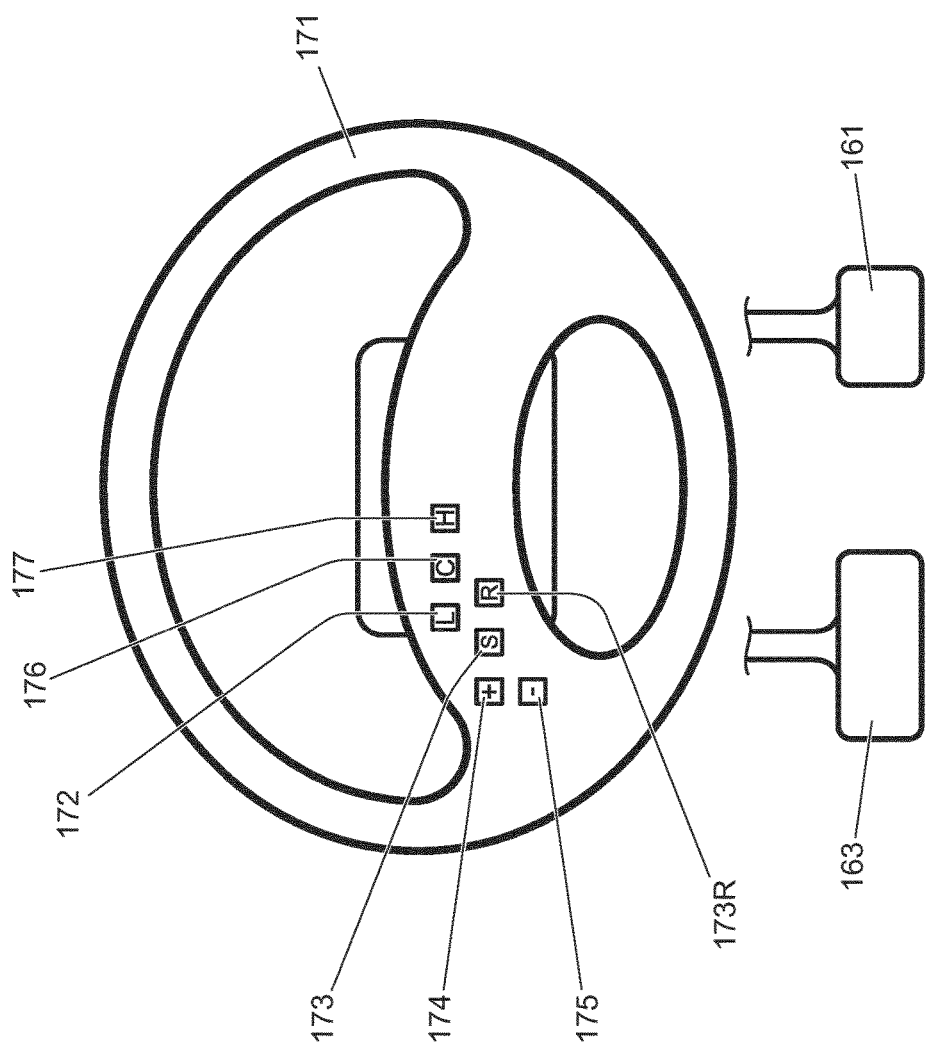
FIG. 4 illustrates a steering wheel and brake and accelerator pedals of a vehicle according to an embodiment of the present invention.

As noted above the vehicle 100 includes a cruise control system 16 which is operable to automatically maintain vehicle speed at a selected target speed when the vehicle is travelling at speeds in excess of 25 kph. The cruise control system 16 is provided with a cruise control HMI (human machine interface) 18 by which means the user can input a target vehicle speed to the cruise control system 16 in a known manner. In one embodiment of the invention, cruise control system input controls are mounted to a steering wheel 171 (FIG. 4). The cruise control system 16 may be switched on by pressing a cruise control system selector button 176. When the cruise control system 16 is switched on, depression of a 'set-speed' control 173 sets the current value of a cruise control set-speed parameter, cruise_set-speed to the current vehicle speed. Depression of a '+' button 174 allows the value of cruise_set-speed to be increased whilst depression of a '−' button 175 allows the value of cruise_set-speed to be decreased. A resume button 173R is provided that is operable to control the cruise control system 16 to resume speed control at the instant value of cruise_set-speed following driver over-ride. It is to be understood that known on-highway cruise control systems including the present system 16 are configured so that, in the event that the user depresses the brake or, in the case of vehicles with a manual transmission, a clutch pedal, the cruise control function is cancelled and the vehicle 100 reverts to a manual mode of operation which requires accelerator pedal input by a user in order to maintain vehicle speed. In addition, detection of a wheel slip event, as may be initiated by a loss of traction, also has the effect of cancelling the cruise control function. Speed control by the system 16 is resumed if the driver subsequently depresses the resume button 173R.

The cruise control system 16 monitors vehicle speed and any deviation from the target vehicle speed is adjusted automatically so that the vehicle speed is maintained at a substantially constant value, typically in excess of 25 kph. In other words, the cruise control system is ineffective at speeds lower than 25 kph. The cruise control HMI 18 may also be configured to provide an alert to the user about the status of the cruise control system 16 via a visual display of the HMI 18. In the present embodiment the cruise control system 16 is configured to allow the value of cruise_set-speed to be set to any value in the range 25-150 kph.

The LSP control system 12 also provides a speed-based control system for the user which enables the user to select a very low target speed at which the vehicle can progress without any pedal inputs being required by the user. Low-speed speed control (or progress control) functionality is not provided by the on-highway cruise control system 16 which operates only at speeds above 25 kph.

The LSP control system 12 is activated by means of a LSP control system selector button 172 mounted on the steering wheel 171. The system 12 is operable to apply selective powertrain, traction control and braking actions to one or more wheels of the vehicle 100, collectively or individually, to maintain the vehicle 100 at the desired speed.

The LSP control system 12 is configured to allow a user to input a desired value of set-speed parameter, LSP_set-speed to the LSP control system 12 via a low-speed progress control HMI (LSP HMI) 20 (FIG. 1, FIG. 3) which shares certain input buttons 173-175 with the cruise control system 16 and HDC control system 12HD. Provided the vehicle speed is within the allowable range of operation of the LSP control system (which is the range from 2 to 30 kph in the present embodiment although other ranges are also useful) the LSP control system 12 controls vehicle speed in accordance with the value of LSP_set-speed. Unlike the cruise control system 16, the LSP control system 12 is configured to operate independently of the occurrence of a traction event. That is, the LSP control system 12 does not cancel speed control upon detection of wheel slip. Rather, the LSP control system 12 actively manages vehicle behaviour when slip is detected.

The LSP control HMI 20 is provided in the vehicle cabin so as to be readily accessible to the user. The user of the vehicle 100 is able to input to the LSP control system 12, via the LSP HMI 20, an indication of the speed at which the user desires the vehicle to travel (referred to as "the target speed") by means of the 'set-speed' button 173 and the '+'/'−' buttons 174, 175 in a similar manner to the cruise control system 16. The LSP HMI 20 also includes a visual display upon which information and guidance can be provided to the user about the status of the LSP control system 12.

The LSP control system 12 receives an input from the braking system 22 of the vehicle indicative of the extent to which the user has applied braking by means of the brake pedal 163. The LSP control system 12 also receives an input from an accelerator pedal 161 indicative of the extent to which the user has depressed the accelerator pedal 161. An input is also provided to the LSP control system 12 from the transmission or gearbox 124. This input may include signals representative of, for example, the speed of an output shaft of the gearbox 124, torque converter slip and a gear ratio request. Other inputs to the LSP control system 12 include an input from the cruise control HMI 18 which is representative of the status (ON/OFF) of the cruise control system 16, and an input from the LSP control HMI 20.

The HDC system 12HD is configured to limit vehicle speed when descending a gradient. When the HDC system 12HD is active, the system 12HD controls the braking system 22 (via brake controller 13) in order to limit vehicle speed to a value corresponding to that of a HDC set-speed parameter HDC_set-speed which may be set by a user. The HDC set-speed may also be referred to as an HDC target speed. Provided the user does not override the HDC system by depressing the accelerator pedal when the HDC system 12HD is active, the HDC system 12HD controls the braking system 22 to prevent vehicle speed from exceeding the value of HDC_set-speed. In the present embodiment the HDC system 12HD is not operable to apply positive drive torque. Rather, the HDC system 12HD is only operable to apply negative brake torque by means of the braking system 22.

A HDC system HMI 20HD is provided by means of which a user may control the HDC system 12HD, including setting the value of HDC_set-speed. An HDC system selector button 177 is provided on the steering wheel 171 by means of which a user may activate the HDC system 12HD to control vehicle speed.

As noted above, the HDC system 12HD is operable to allow a user to set a value of HDC set-speed parameter HDC_set-speed and to adjust the value of HDC_set-speed using the same controls as the cruise control system 16 and LSP control system 12. Thus, in the present embodiment, when the HDC system 12HD is controlling vehicle speed, the HDC system set-speed may be increased, decreased or set to an instant speed of the vehicle in a similar manner to the set-speed of the cruise control system 16 and LSP control system, using the same control buttons 173, 173R, 174, 175.

The HDC system 12HD is operable to allow the value of HDC_set-speed to be set to any value in the range from 2-30 kph.

If the HDC system 12HD is selected when the vehicle 100 is travelling at a speed of 50 kph or less and no other speed control system is in operation, the HDC system 12HD sets the value of HDC_set-speed to a value selected from a look-up table. The value output by the look-up table is determined in dependence on the identity of the currently selected transmission gear, the currently selected PTU gear ratio (Hi/LO) and the currently selected driving mode. The HDC system 12HD then applies the powertrain 129 and/or braking system 22 to slow the vehicle 100 to the HDC system set-speed provided the driver does not override the HDC system 12HD by depressing the accelerator pedal 161. The HDC system 12HD is configured to slow the vehicle 100 to the set-speed value at a deceleration rate not exceeding a maximum allowable rate. The rate is set as 1.25 ms-2 in the present embodiment, however other values are also useful. If the user subsequently presses the 'set-speed' button 173 the HDC system 12HD sets the value of HDC_set-speed to the instant vehicle speed provided the instant speed is 30 kph or less. If the HDC system 12HD is selected when the vehicle 100 is travelling at a speed exceeding 50 kph, the HDC system 12HD ignores the request and provides an indication to the user that the request has been ignored.

It is to be understood that the VCU 10 is configured to implement a known Terrain Response (TR) (RTM) System of the kind described above in which the VCU 10 controls settings of one or more vehicle systems or sub-systems such as the powertrain controller 11 in dependence on a selected driving mode. The driving mode may be selected by a user by means of a driving mode selector 141S (FIG. 1). The driving modes may also be referred to as terrain modes, terrain response modes, or control modes. In the embodiment of FIG. 1 five driving modes are provided: an 'on-highway' driving mode suitable for driving on a relatively hard, smooth driving surface where a relatively high surface coefficient of friction exists between the driving surface and wheels of the vehicle; a 'sand' driving mode suitable for driving over sandy terrain; a 'grass, gravel or snow' (GGS) driving mode suitable for driving over grass, gravel or snow, a 'rock crawl' (RC) driving mode suitable for driving slowly over a rocky surface; and a 'mud and ruts' (MR) driving mode suitable for driving in muddy, rutted terrain. Other driving modes may be provided in addition or instead.

In some embodiments, the LSP control system 12 may be in either one of an active condition, a standby condition and an 'off' condition. In the active condition, the LSP control system 12 actively manages vehicle speed by controlling powertrain torque and braking system torque. In the standby condition, the LSP control system 12 does not control vehicle speed until a user presses the resume button 173R or the 'set speed' button 173. In the off condition the LSP control system 12 is not responsive to input controls until the LSP control system selector button 172 is depressed.

In the present embodiment the LSP control system 12 is also operable to assume an intermediate condition similar to that of the active mode but in which the LSP control system 12 is prevented from commanding the application of positive drive torque to one or more wheels of the vehicle 100 by the powertrain 129. Thus, only braking torque may be applied, by means of the braking system 22 and/or powertrain 129. Other arrangements are also useful.

With the LSP control system 12 in the active condition, the user may increase or decrease the vehicle set-speed by means of the '+' and '−' buttons 174, 175. In addition, the user may optionally also increase or decrease the vehicle set-speed by lightly pressing the accelerator or brake pedals 161, 163 respectively. In some embodiments, with the LSP control system 12 in the active condition the '+' and '−' buttons 174, 175 may be disabled such that adjustment of the value of LSP_set-speed can only be made by means of the accelerator and brake pedals 161, 163. This latter feature may prevent unintentional changes in set-speed from occurring, for example due to accidental pressing of one of the '+' or '−' buttons 174, 175. Accidental pressing may occur for example when negotiating difficult terrain where relatively large and frequent changes in steering angle may be required. Other arrangements are also useful.

It is to be understood that in the present embodiment the LSP control system 12 is operable to cause the vehicle to travel in accordance with a value of set-speed in the range from 2-30 kph whilst the cruise control system is operable to cause the vehicle to travel in accordance with a value of set-speed in the range from 25-150 kph although other values are also useful. If the LSP control system 12 is selected when the vehicle speed is above 30 kph but less than or substantially equal to 50 kph, the LSP control system 12 assumes the intermediate mode. In the intermediate mode, if the driver releases the accelerator pedal 161 whilst travelling above 30 kph the LSP control system 12 deploys the braking system 22 to slow the vehicle 100 to a value of set-speed corresponding to the value of parameter LSP_set-speed. Once the vehicle speed falls to 30 kph or below, the LSP control system 12 assumes the active condition in which it is operable to apply positive drive torque via the powertrain 129, as well as brake torque via the powertrain 129 (via engine braking) and the braking system 22 in order to control the vehicle in accordance with the LSP_set-speed value. If no LSP set-speed value has been set, the LSP control system 12 assumes the standby mode.

It is to be understood that if the LSP control system 12 is in the active mode, operation of the cruise control system 16 is inhibited. The two systems 12, 16 therefore operate independently of one another, so that only one can be operable at any one time, depending on the speed at which the vehicle is travelling.

Figure 5:
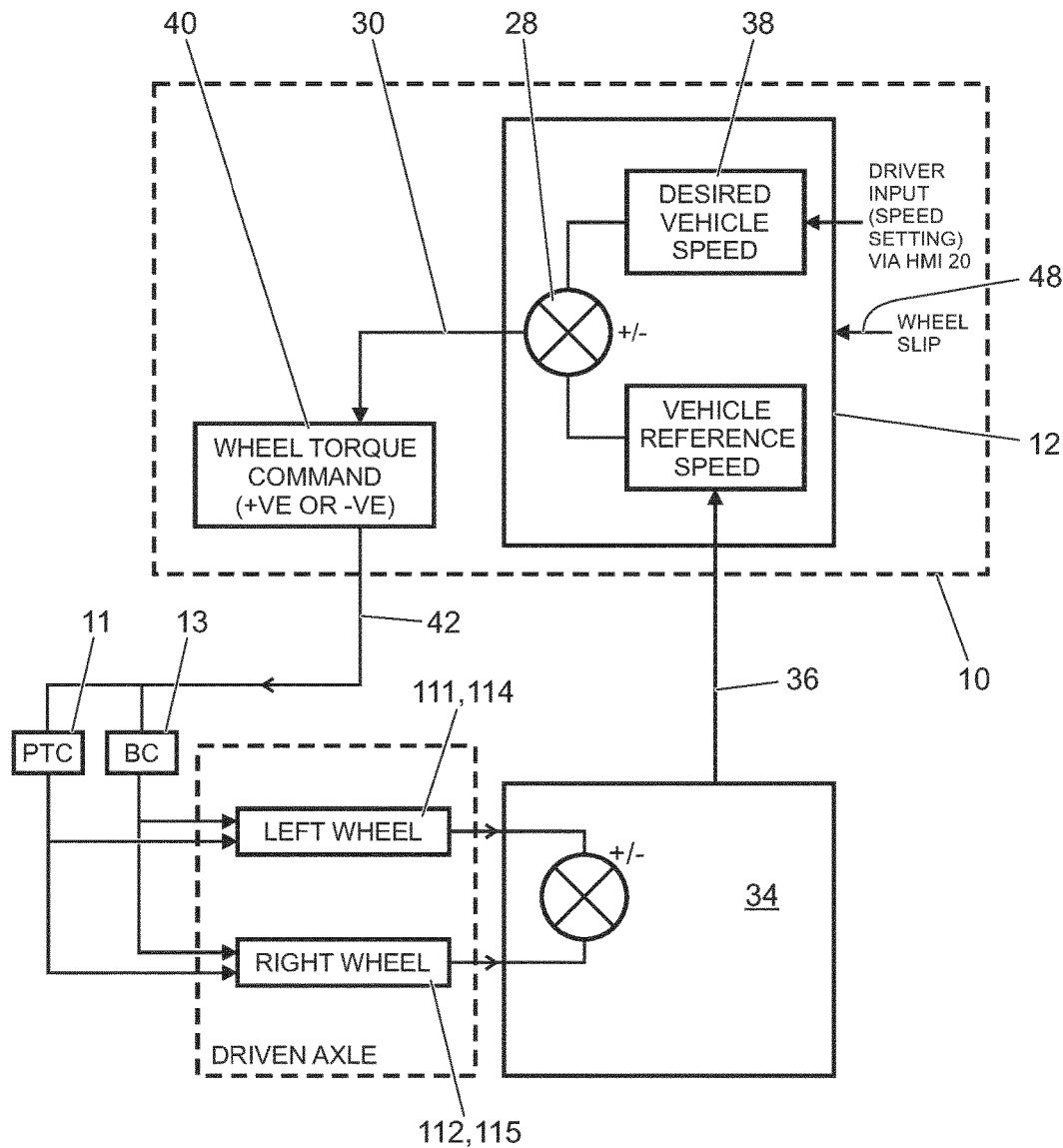
FIG. 5 is a schematic diagram illustrating operation of the vehicle speed control system of the embodiment of FIG. 1.

FIG. 5 illustrates the means by which vehicle speed is controlled in the LSP control system 12 in the embodiment of FIG. 1. As described above, a speed selected by a user (set-speed) is input to the LSP control system 12 via the LSP control HMI 20. A vehicle speed sensor 34 associated with the powertrain 129 (shown in FIG. 1) provides a signal 36 indicative of vehicle speed to the LSP control system 12. The LSP control system 12 includes a comparator 28 which compares the set-speed 38 (also referred to as a 'target speed' 38) selected by the user with the measured speed 36 and provides an output signal 30 indicative of the comparison. The output signal 30 is provided to an evaluator unit 40 of the VCU 10 which interprets the output signal 30 as either a demand for additional torque to be applied to the vehicle wheels 111-115, or for a reduction in torque applied to the vehicle wheels 111-115, depending on whether the vehicle speed needs to be increased or decreased to maintain the speed LSP_set-speed. An increase in torque is generally accomplished by increasing the amount of powertrain torque delivered to a given position of the powertrain, for example an engine output shaft, a wheel or any other suitable location. A decrease in torque at a given wheel to a value that is less positive or more negative may be accomplished by decreasing powertrain torque delivered to a wheel and/or by increasing a braking force on a wheel. It is to be understood that in some embodiments in which a powertrain 129 has one or more electric machines operable as a generator, negative torque may be applied by the powertrain 129 to one or more wheels by the electric machine. Negative torque may also be applied by means of engine braking in some circumstances, depending at least in part on the speed at which the vehicle 100 is moving. If one or more electric machines are provided that are operable as propulsion motors, positive drive torque may be applied by means of the one or more electric machines.

An output 42 from the evaluator unit 40 is provided to the powertrain controller 11 and brake controller 13 which in turn control a net torque applied to the vehicle wheels 111-115. The net torque may be increased or decreased depending on whether the evaluator unit 40 demands positive or negative torque. In order to cause application of the necessary positive or negative torque to the wheels, the evaluator unit 40 may command that positive or negative torque is applied to the vehicle wheels by the powertrain 129 and/or that a braking force is applied to the vehicle wheels by the braking system 22, either or both of which may be used to implement the change in torque that is necessary to attain and maintain a required vehicle speed. In the illustrated embodiment the torque is applied to the vehicle wheels individually so as to maintain the vehicle at the required speed, but in another embodiment torque may be applied to the wheels collectively to maintain the required speed. In some embodiments, the powertrain controller 11 may be operable to control an amount of torque applied to one or more wheels by controlling a driveline component such as a rear drive unit, front drive unit, differential or any other suitable component. For example, one or more components of the driveline 130 may include one or more clutches operable to allow an amount of torque applied to one or more wheels to be varied. The rear drive unit may for example be in the form of a twin clutch assembly such as the GKN TWINSTER rear drive unit, which employs clutch devices instead of a conventional differential arrangement. Other arrangements are also useful.

Where a powertrain 129 includes one or more electric machines, for example one or more propulsion motors and/or generators, the powertrain controller 11 may be operable to modulate torque applied to one or more wheels by means of one or more electric machines.

The LSP control system 12 also receives a signal 48 indicative of a wheel slip event having occurred. This may be the same signal 48 that is supplied to the on-highway cruise control system 16 of the vehicle, and which in the case of the latter triggers an override or inhibit mode of operation in the on-highway cruise control system 16 so that automatic control of vehicle speed by the on-highway cruise control system 16 is suspended or cancelled. However, the LSP control system 12 is not arranged to cancel or suspend operation in dependence on receipt of a wheel slip signal 48 indicative of wheel slip. Rather, the system 12 is arranged to monitor and subsequently manage wheel slip so as to reduce driver workload. During a slip event, the LSP control system 12 continues to compare the measured vehicle speed with the value of LSP_set-speed, and continues to control automatically the torque applied to the vehicle wheels so as to maintain vehicle speed at the selected value. It is to be understood therefore that the LSP control system 12 is configured differently to the cruise control system 16, for which a wheel slip event has the effect of overriding the cruise control function so that manual operation of the vehicle must be resumed, or speed control by the cruise control system 12 resumed by pressing the resume button 173R or set-speed button 173.

In a further embodiment of the present invention (not shown) a wheel slip signal 48 is derived not just from a comparison of wheel speeds, but further refined using sensor data indicative of the vehicle's speed over ground. Such a speed over ground determination may be made via global positioning (GPS) data, or via a vehicle mounted radar or laser based system arranged to determine the relative movement of the vehicle 100 and the ground over which it is travelling. A camera system may be employed for determining speed over ground in some embodiments.

At any stage of the LSP control process the user can override the function by depressing the accelerator pedal 161 and/or brake pedal 163 to adjust the vehicle speed in a positive or negative sense. However, in the event that a wheel slip event is detected via signal 48, the LSP control system 12 remains active and control of vehicle speed by the LSP control system 12 is not suspended. As shown in FIG. 4, this may be implemented by providing a wheel slip event signal 48 to the LSP control system 12 which is then managed by the LSP control system 12. In the embodiment shown in FIG. 1 the SCS 14S generates the wheel slip event signal 48 and supplies it to the LSP control system 12 and cruise control system 16.

A wheel slip event is triggered when a loss of traction occurs at any one of the vehicle wheels. Wheels and tyres may be more prone to losing traction when travelling for example on snow, ice, mud or sand and/or on steep gradients or cross-slopes. A vehicle 100 may also be more prone to losing traction in environments where the terrain is more uneven or slippery compared with driving on a highway in normal on-road conditions. Embodiments of the present invention therefore find particular benefit when the vehicle 100 is being driven in an off-road environment, or in conditions in which wheel slip may commonly occur. Manual operation in such conditions can be a difficult and often stressful experience for the driver and may result in an uncomfortable ride.

The vehicle 100 is also provided with additional sensors (not shown) which are representative of a variety of different parameters associated with vehicle motion and status. These may be inertial systems unique to the LSP or HDC control system 12, 12HD or part of an occupant restraint system or any other sub-system which may provide data from sensors such as gyros and/or accelerometers that may be indicative of vehicle body movement and may provide a useful input to the LSP and/or HDC control systems 12, 12HD. The signals from the sensors provide, or are used to calculate, a plurality of driving condition indicators (also referred to as terrain indicators) which are indicative of the nature of the terrain conditions over which the vehicle is travelling.

The sensors (not shown) on the vehicle 100 include, but are not limited to, sensors which provide continuous sensor outputs to the VCU 10, including wheel speed sensors, as mentioned previously and as shown in FIG. 1, an ambient temperature sensor, an atmospheric pressure sensor, tyre pressure sensors, wheel articulation sensors, gyroscopic sensors to detect vehicular yaw, roll and pitch angle and rate, a vehicle speed sensor, a longitudinal acceleration sensor, an engine torque sensor (or engine torque estimator), a steering angle sensor, a steering wheel speed sensor, a gradient sensor (or gradient estimator), a lateral acceleration sensor which may be part of the SCS 14S, a brake pedal position sensor, a brake pressure sensor, an accelerator pedal position sensor, longitudinal, lateral and vertical motion sensors, and water detection sensors forming part of a vehicle wading assistance system (not shown). In other embodiments, only a selection of the aforementioned sensors may be used.

The VCU 10 also receives a signal from the steering controller 170C. The steering controller 170C is in the form of an electronic power assisted steering unit (ePAS unit). The steering controller 170C provides a signal to the VCU 10 indicative of the steering force being applied to steerable road wheels 111, 112 of the vehicle 100. This force corresponds to that applied by a user to the steering wheel 171 in combination with steering force generated by the ePAS unit 170C.

The VCU 10 evaluates the various sensor inputs to determine the probability that each of a plurality of different control modes (driving modes) for the vehicle subsystems is appropriate, with each control mode corresponding to a particular terrain type over which the vehicle is travelling (for example, mud and ruts, sand, grass/gravel/snow).

If the user has selected operation of the vehicle in an automatic driving mode selection condition, the VCU 10 then selects the most appropriate one of the control modes and is configured automatically to control the subsystems according to the selected mode. This aspect of the invention is described in further detail in our co-pending patent publication nos. GB2492748, GB2492655 and GB2499279, the contents of each of which is incorporated herein by reference.

The nature of the terrain over which the vehicle is travelling (as determined by reference to the selected control mode) may also be utilised in the LSP control system 12 to determine an appropriate increase or decrease in vehicle speed. For example, if the user selects a value of LSP_set-speed that is not suitable for the nature of the terrain over which the vehicle is travelling, the system 12 is operable to automatically adjust the vehicle speed downwards by reducing the speed of the vehicle wheels. In some cases, for example, the user selected speed may not be achievable or appropriate over certain terrain types, particularly in the case of uneven or rough surfaces. If the system 12 selects a set-speed that differs from the user-selected set-speed, a visual indication of the speed constraint is provided to the user via the LSP HMI 20 to indicate that an alternative speed has been adopted.

LSSA

The VCU 10 is configured to implement a low speed steering assistance (LSSA) function when requested by a user in which the VCU 10 controls the torque applied to one or more wheels of the vehicle 100 in order to reduce a turning circle of the vehicle 100.

In the present embodiment, the LSSA function is selected by means of a selector button 175S mounted to a centre console of the vehicle 100. In some alternative embodiments the LSSA function is selected via a touchscreen providing a visual display unit for the VCU 10. In some embodiments, in addition or instead the VCU 10 may be configured automatically to select the LSSA function when one or more predetermined conditions are met as described below, although preferably LSSA will only be applied when specifically selected by the driver.

When selected, the LSSA function is configured to cause application of braking to a trailing inside wheel when a steering wheel 171 of the vehicle 100 is turned through an angle steering_angle exceeding a predetermined threshold value steering_angle_threshold with respect to a reference position of the steering wheel corresponding to straight line travel. In the present embodiment the value of steering_angle_threshold may be in the range of 60% to 85% of the maximum steering angle (full steering lock), in particular it may be substantially 270 degrees (approx. 70% of the maximum steering angle) although other values are also useful. The maximum angle through which the steering wheel may be turned either to the left or right is given by parameter steering_angle_max.

It will be understood that the term trailing wheel used herein refers to a wheel on the rear most axle relative to the direction of travel. Likewise, the term leading wheel refers to a wheel on the forward most axle relative to the direction of travel.

The VCU 10 is configured to implement the LSSA function to cause application of braking to a trailing inside wheel provided the following requirements are met:
(a) a steering wheel 171 of the vehicle 100 is turned through an angle exceeding a predetermined threshold value steering_angle_threshold;
(b) the vehicle speed is less than a maximum threshold value LSSA_speed_max;
(c) the VCU 10 is not operating in the automatic driving mode selection condition; and
(d) the VCU 10 has not detected that the vehicle 100 is towing a trailer.

Provided that each of the above conditions are met, the VCU 10 calculates an amount of brake torque LSSA_br_torque_calc that is to be applied to a trailing inside wheel when the angle of the steering wheel 171 with respect to the position corresponding to driving in a substantially straight direction, steering_angle, exceeds steering_angle_threshold. The value of LSSA_br_torque_calc is arranged to increase with increasing steering angle up to a maximum value LSSA_br_torque_calc_max at a value of steering_angle of substantially 350 degrees, being an angle 10 degrees prior to attaining full steering lock (which occurs at one full rotation of the steering wheel 171 in the present embodiment). That is, the value of LSSA_br_torque_calc is set equal to LSSA_br_torque_calc_max from a value of steering_angle that is substantially 10 degrees lower than steering_angle_max, up to a value of steering_angle of steering_angle_max.

In the present embodiment the value of LSSA_br_torque_calc_max is calculated by the VCU 10 in dependence on the value of surface coefficient of friction of the surface over which the vehicle 100 is driving. The VCU 10 is configured to calculate a maximum amount of brake torque that can be applied at a given moment in time before a threshold value of slip of the trailing inside wheel exceeds a prescribed amount. The value of LSSA_br_torque_calc_max is then set this maximum amount of brake torque. This feature of the present embodiment has the advantage that the inside trailing wheel may be prevented from suffering excessive slip by monitoring the value of surface coefficient of friction and modifying the value of LSSA_br_torque_calc_max accordingly. It is to be understood that the VCU 10 may take into account an amount of weight on the rear inside wheel as well as the value of surface coefficient of friction in determining the value of LSSA_br_torque_calc_max. In some embodiments, the threshold amount of slip may be determined at least in part by reference to a driving mode in which the vehicle is operating, for example whether the vehicle is operating in the GGS mode or the MR mode. The slip threshold may be lower in one mode than the other. For example the slip threshold may be lower in the GGS mode than the MR mode in some embodiments. In some other embodiments the slip threshold may be higher in the GGS mode than the MR mode.

In some embodiments, in addition of instead the value of LSSA_br_torque_calc_max may be calculated in dependence at least in part on the operating mode in which the vehicle is operating. The value of LSSA_br_torque_calc_max may be arranged to be lower in some operating modes than others; in particular, for operating modes adapted for operations on driving surfaces of particularly low surface coefficient of friction the value of LSSA_br_torque_calc_max may be lower than in operating modes adapted for operations on driving surfaces of higher surface coefficient of friction. In some embodiments the value of LSSA_br_torque_calc_max may be higher in the GGS mode compared with the MR mode. In some alternative embodiments the value of LSSA_br_torque_calc_max may be higher in the MR mode compared with the GGS mode in order to facilitate exit from ruts in a driving surface. Other arrangements are also useful.

The VCU 10 may optionally be further configured to only implement the LSSA function to cause application of braking to a trailing inside wheel provided that one or more following requirements are also met:
(e) the VCU 10 is not causing the vehicle to operate in the SPO driving mode or rock crawl (RC) driving mode;
(f) the PTU 131P is in the low ('lo') range and not the high ('hi') range;
(g) the transmission 124 is in a forward driving mode of operation, such as 'drive' (or 'D') and not a reverse driving mode of operation such as 'R'.

It is to be understood that in the present embodiment the value of LSSA_br_torque_calc is arranged to increase substantially linearly with increasing steering angle to the maximum value LSSA_br_torque_calc_max. Other arrangements are also useful.

Figure 6:
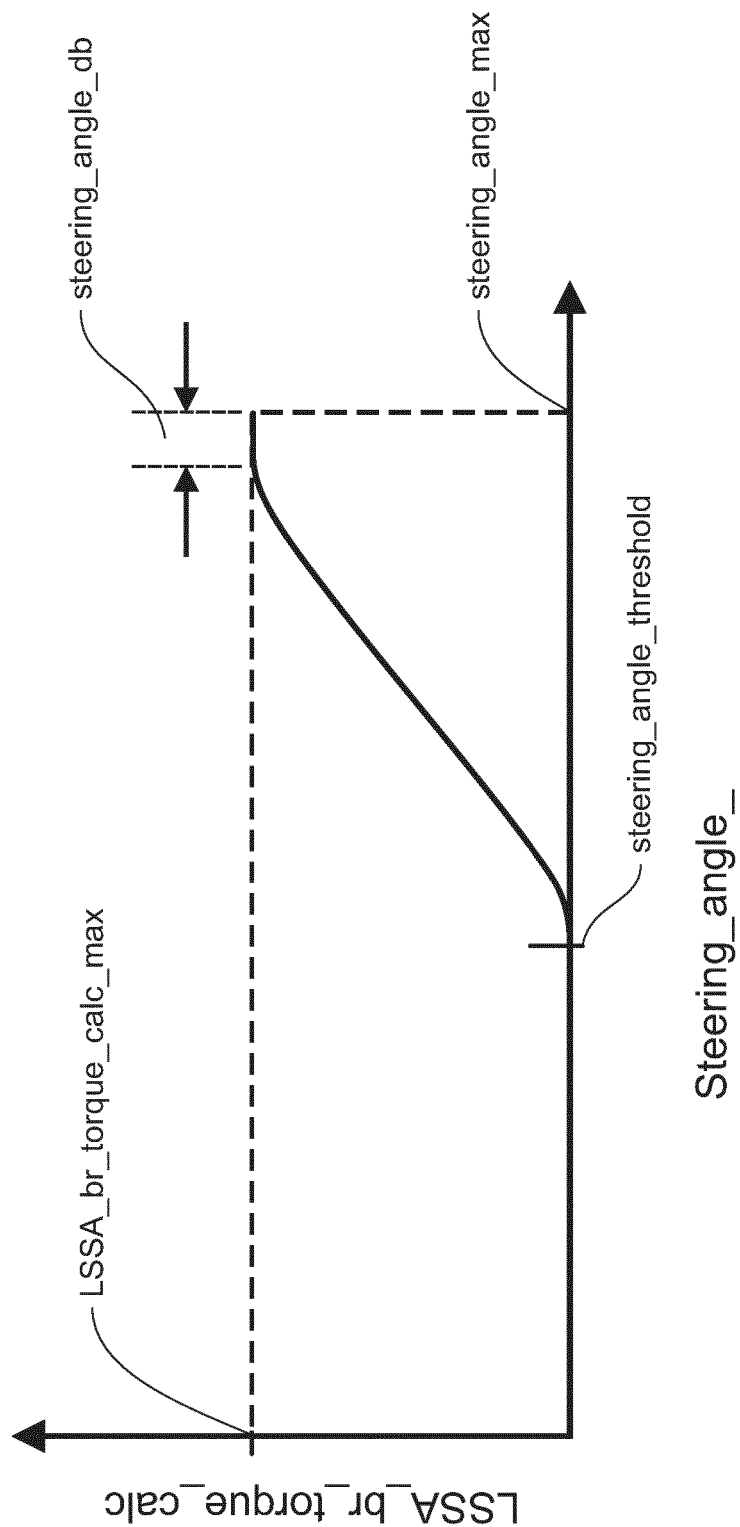
FIG. 6 is a plot of parameter LSSA_br_torque_calc as a function of steering_angle.

FIG. 6 illustrates the value of LSSA_br_torque as a function of steering_angle. It can be seen from FIG. 6 that once steering angle exceeds steering_angle_threshold, the value of LSSA_br_torque increases to a maximum value LSSA_br_torque_max at a value of steering_angle that is lower than a maximum permitted value of steering_angle, steering_angle_max, by an amount steering_angle_db. In the present embodiment steering_angle_db is set to a value of substantially 10°. Other values are also useful. The fact that LSSA_br_torque saturates prior to steering_angle_max being attained has the advantage that a driver may be dissuaded from holding the steering wheel 171 at full lock in order to achieve maximum assistance from the LSSA function.

The VCU 10 is also configured to monitor a speed of the vehicle by monitoring a reference speed signal v_ref indicative of a reference speed of the vehicle. The reference speed signal is generated by the brake controller 13 and is communicated to the VCU 10. The vehicle also monitors a signal indicative of an amount of powertrain torque, PT_tq, that powertrain controller 11 is commanded to develop at a given moment in time.

In response to the values of v_ref and PT_tq the VCU 10 is configured to adjust the amount of steering assistance that is actually provided by the LSSA function at a given moment in time. The VCU 10 does this by setting a value of brake torque that the brake controller 11 is commanded to cause to be applied to the trailing inside wheel, LSSA_br_torque_cmd, equal to LSSA_br_torque_calc multiplied by a velocity reduction factor F_v and a powertrain torque reduction factor F_PT:

$$\text{LSSA\_br\_torque\_cmd} = F\_v \times F\_PT \times \text{LSSA\_br\_torque\_calc}$$

Figure 7:
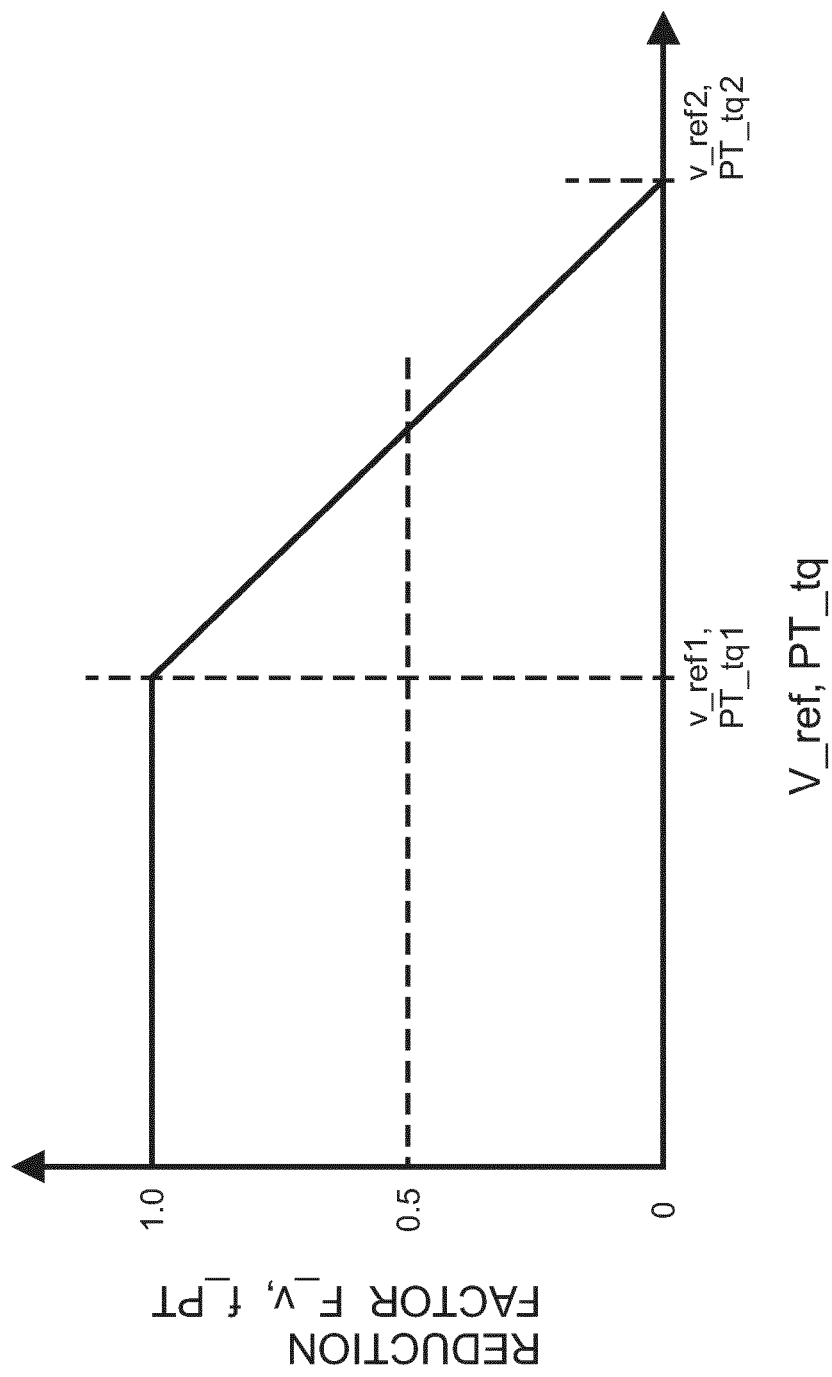
FIG. 7 is a plot of reduction factors F_v, F_PT as a function of v_ref and PT_tq.

FIG. 7 illustrates the form of the relationships between reduction factor F_v and v_ref, and between reduction factor F_PT and PT_tq, that are applied by the VCU 10. It can be seen that as the value of v_ref increases from lower threshold value v_ref1 to upper threshold value v_ref2, the value of F_v decreases from 1.0 to 0. At values of v_ref below v_ref1 substantially no reduction in the value of LSSA_br_torque_cmd takes place due to speed, whilst at values of v_ref above v_ref2 substantially no steering assistance will be provided, i.e. LSSA_br_torque_cmd is set substantially equal to zero.

Similarly, as the value of PT_tq increases from lower threshold value PT_tq1 to upper threshold value PT_tq2, the value of F_PT decreases from 1.0 to 0. At values of PT_tq below PT_tq1 substantially no reduction in the value of LSSA_br_torque_cmd takes place due to the value of demanded torque, whilst at values of PT_tq above PT_tq2 substantially no steering assistance will be provided, i.e. LSSA_br_torque_cmd is set substantially equal to zero.

In some embodiments, including the present embodiment, the values of v_ref1, v_ref2, PT_tq1 and PT_tq2 are set by the VCU 10 in dependence on the driving mode in which the VCU 10 is operating. The VCU 10 determines the values required to be used by reference to a look-up table stored in a memory thereof.

In the present embodiment, the VCU 10 is configured not to permit the LSSA function to be implemented if the VCU 10 is operating in the highway mode (SPO mode) or rock crawl mode. This is at least in part because highway driving surfaces (typically asphalt) and rock typically offer a relatively high surface coefficient of friction. Accordingly, the surfaces offer relatively high resistance to turning induced by braking an inside trailing wheel, and use of the LSSA function on such surfaces is likely to result in increasing wear of tyres of the vehicle 100 at least.

In the present embodiment the VCU 10 is configured to prevent the LSSA function from applying brake torque to an inside trailing wheel if the vehicle 100 is stationary and the brake pedal 163 is depressed.

In some embodiments the VCU 10 may be configured to cause application of brake pressure to a leading inside wheel in addition to or instead of the trailing inside wheel when the LSSA function requires application of brake torque. In some embodiments brake torque may be proportioned between leading and trailing inside wheels. Other arrangements are also useful.

Figure 8B:
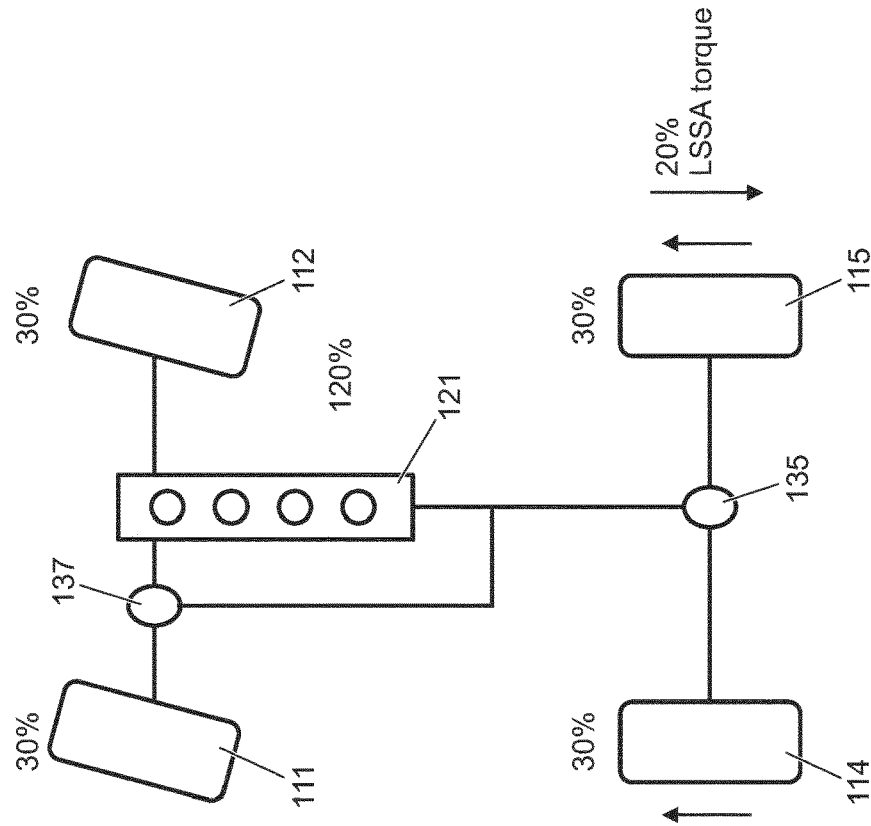
FIG. 8 is a schematic diagram of a vehicle illustrating torque distribution of the vehicle according to an embodiment of the invention.
Figure 8A:
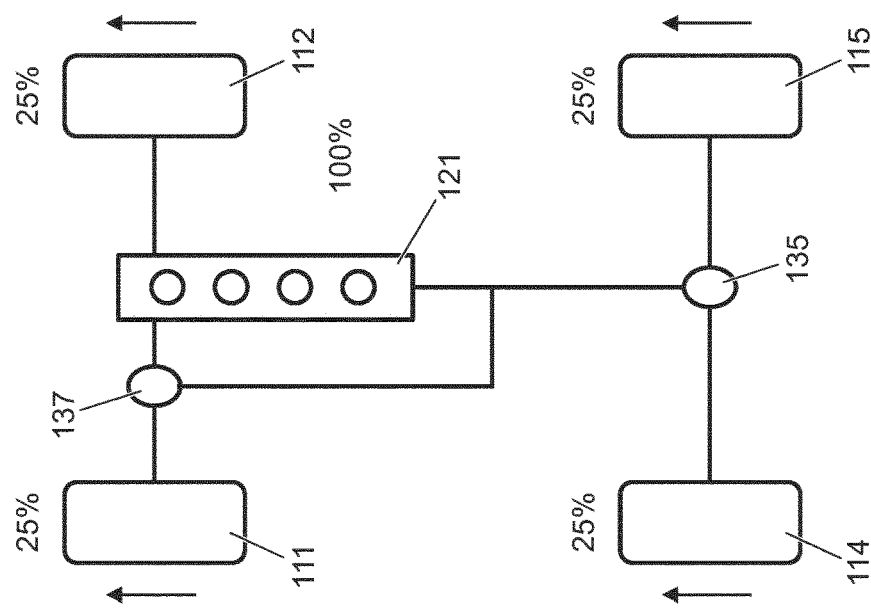

In an embodiment, the VCU 10 is configured to control the amount of torque being applied to one or more driven wheels of the vehicle 100 such that the sum of the torques at each driven wheel is equal amount of net engine torque. For example, as illustrated in FIG. 8a, when the LSSA is not implemented the net torque of 100% of the currently produced engine torque has been equally distributed; applying 25% of positive torque to each of the wheels 111-115. It will be appreciated that the even distribution of 25% torque to each wheel is for illustration only and that any torque distribution may be effected. As illustrated in FIG. 8b, the VCU 10 permits the LSSA to be implemented if the above mentioned conditions are satisfied, the LSSA_br_torque applied to an inside trailing wheel 115 will be added to the net torque produced by the engine to determine the newly calculated positive torque requirement from the engine. This new, engine torque will be equally distributed amongst all the wheels 111-115. The amount of LSSA_br_torque applied to an inside trailing wheel 115 is compensated by adding the same amount of the torque to the net torque of the vehicle 100. This addition of the positive torque does not change the speed of the vehicle 100, but it helps the vehicle 100 to maintain its composure by maintaining constant torque delivery to the surface. The total torque delivered to the surface on which the wheel is travelling (engine torque—LSSA_br_torque) equals to the previous engine torque prior to activation of the LSSA system, and therefore the total torque delivered to the road surface is maintained constant. The inside trailing wheel 115 will effectively have a reduction in its torque. In FIG. 8b, the LSSA function has determined the need for a LSSA_br_torque that equates to 20% of the current engine output torque. The VCU 10 receives the signal from LSSA function and increases the engine torque to 120% of the previously generated engine torque, and maps an equal amount of the torque, 30%, to be distributed to each of the wheels 111-115. This results in the inside trailing wheel 115 to have net torque of 10% (30% system torque—20% LSSA brake torque) and the rest of the wheels 111-114 receive increased positive torque to compensate the reduction in the net torque of the inside trailing wheel 115.

Furthermore, in the present embodiment the VCU 10 may be configured to permit the LSSA function to cause application of brake torque to an inside wheel when the transmission 124 is in the reverse mode of operation as well as when the transmission 124 is in the drive mode of operation.

In some embodiments the VCU 10 or TCS 14T may be configured to monitor a speed of a wheel to which brake torque has been caused to be applied by the LSSA function to ensure that the wheel does not lock (remain stationary) for more than a prescribed distance of travel or number of rotations of one or more other wheels of the vehicle 100. In the present embodiment the VCU 10 is configured to ensure that the trailing inside wheel does not remain stationary for more than substantially half a turn of a trailing outside wheel. If the condition arises that the trailing inside wheel does lock, brake pressure to the trailing inside wheel is reduced after the trailing outside wheel has turned through substantially half a turn, in order to allow the trailing inside wheel to turn. Other arrangements are also useful.

In the present embodiment, if the LSSA function is selected by a user whilst conditions are met permitting the LSSA function to cause application of brake torque, the LSSA function is configured to cause an amount of brake torque commanded by the VCU 10, LSSA_br_torque_cmd, to increase to the predetermined value to be applied in a gradual manner as opposed to a rapid and relative abrupt manner. In the present embodiment a ramp function is applied to increase the value of LSSA_br_torque_cmd to the predetermined value in a substantially linear manner at a predetermined rate.

Similarly, if the LSSA function is deselected whilst the LSSA function is commanding application of brake torque to an inside wheel, the amount of commanded brake torque is reduced gradually. In the present embodiment the amount of commanded brake torque is reduced in a substantially linear manner at a predetermined rate.

If a driver of the vehicle 100 depresses the brake pedal 163 whilst the vehicle 100 is being driven and the LSSA function is commanding application of brake torque to reduce vehicle turning circle, the LSSA function is configured to apply an increased amount of brake torque to the trailing inside wheel, the amount of the increase being dependent on the amount of braking commanded by a driver. The LSSA function is configured to maintain an increased amount of braking of the trailing inside wheel relative to the amount that would have been applied if the LSSA function was not causing application of brake torque. This feature has the advantage that a driver may enjoy the benefit of a reduced turning circle even under conditions in which a driver has depressed the brake pedal 163 in order to control vehicle speed, for example when idle creep speed is too high for the prevailing driving conditions, or when descending an incline. It will be appreciated that braking force will be applied to the other wheels of the vehicle in the normal manner. The total braking torque requested by driver braking may be distributed evenly to the wheels, and the additional LSSA braking force applied to the inside trailing wheel, or alternatively the total braking force requested by the driver could be distributed between the wheels such that the trailing inside wheel receives a braking torque exceeding the braking torque at the other wheels by the LSSA braking force.

In some embodiments, the VCU 10 is configured to monitor slip of one or more wheels of the vehicle 100 when the LSSA function causes application of brake torque. The VCU 10 determines whether excessive slip of one or more driving wheels is taking place due to redistribution of torque between driving wheels as a consequence of the application of brake torque by the LSSA function.

It is to be understood that reference to the application of brake torque by the LSSA function includes the causing of an increase in the amount of brake torque applied to a given wheel to which brake torque is already being applied, and causing an increase in the amount of brake torque applied to a given wheel to which brake torque is not yet being applied, i.e. increasing the amount of brake torque from substantially zero.

The VCU 10 may be configured in some embodiments to monitor pitch, roll and yaw of the vehicle 100. Prior to permitting the LSSA function to cause an increase in the amount of brake torque applied to an inside wheel, the VCU 10 may be configured to determine whether the amount of brake torque that the LSSA function will cause to be applied is likely to cause vehicle instability. In the present embodiment the VCU 10 determines the amount of lateral acceleration currently experienced by the vehicle 100 and the amount by which the lateral acceleration is likely to increase if the LSSA function is permitted to cause an increase in the amount of brake torque applied to an inside wheel. If the VCU 10 determines that vehicle instability may result, the VCU 10 prevents the LSSA function from causing application of torque to an inside wheel. In some alternative embodiments the VCU 10 may limit the amount of brake torque the LSSA function is permitted to cause to be applied, so as not to cause instability. Other arrangements are also useful.

In the present embodiment, the VCU 10 is configured to monitor a signal indicative of a surface coefficient of friction, surface_mu, between wheels of the vehicle 100 and a driving surface. The VCU 10 calculates, based on the value of surface_mu and v_ref, the maximum amount of brake torque, brake_tq_max, that may be applied to the inside trailing wheel before slip of that wheel is likely to exceed a predetermined slip value which is itself a function of v_ref. Subsequently, the VCU 10 ensures that the amount of brake torque that the LSSA function commands in order to inducing turning, brake_tq_cmd, does not cause the total amount of brake torque applied to the inside wheel to exceed brake_tq_max. Thus if the amount of brake torque being applied by a braking system in response to user depression of the brake pedal 163 is already equal to or exceeds brake_tq_max, the VCU 10 does not allow the LSSA function to cause a further increase in brake torque applied. Other arrangements are also useful.

In some embodiments the VCU 10 may cause a notification to be provided to a driver indicating that terrain over which the vehicle 100 is travelling is unsuitable for use of the LSSA function to reduce turning circle. Such a notification may be provided if one or more conditions are met, for example that the surface coefficient of friction between the driving surface and vehicle wheels exceeds a predetermined value, for example a value of 0.6. Other values are also useful. Methods of measuring surface coefficient of friction, for example by reference to an amount of wheel torque applied to a wheel when slip exceeding a predetermined amount was detected. The predetermined amount may be determined in dependence on vehicle speed and/or one or more other parameters.

In some embodiments, the VCU 10 may monitor a side-slope angle of a driving surface on which a vehicle is operating, for example by reference to values of longitudinal and lateral acceleration of the vehicle 100. The VCU 10 may be configured to cause the amount of negative torque commanded by the LSSA function to reduce with increasing side-slope angle and to be substantially zero if the side-slope angle exceeds a predetermined value. The predetermined value may be dependent on one or more parameters such as the surface coefficient of friction between the driving surface and wheels, and/or the driving mode in which the VCU 10 causing the vehicle 100 to operate. If the side-slope angle exceeds the predetermined value whilst the LSSA function is causing application of brake torque to an inside trailing wheel to induce turning the VCU 10 causes the amount of brake to torque to decrease to substantially zero at a predetermined rate.

In the present embodiment, the VCU 10 is configured to monitor the total amount of powertrain drive torque delivered to rear axle 136R. If the total amount of powertrain drive torque exceeds a predetermined amount, in the present embodiment 2500 Nm, the VCU 10 prevents the LSSA function from causing application of brake torque to an inside wheel of the rear axle 136R. This is so as to prevent excessive torque being applied to components of the rear axle 136R due to application of brake torque to the trailing inside wheel by the LSSA function.

It is to be understood that the total powertrain torque at the rear axle 136R may be calculated taking into account the amount of torque generated by the engine 121, the gear in which the transmission 124 is operating, the selected range of the PTU 131P (which must be the low range for the LSSA function to be active in the present embodiment), and an amount of any cross-axle lock imposed on the rear differential 135.

The VCU 10 is also configured to prevent the LSSA function from causing application of brake torque to an inside wheel if the VCU 10 determines that the vehicle 100 may be towing a load. In the present embodiment the VCU 10 is configured to receive a signal indicative of whether or not a trailer lighting connector of the vehicle 100 is connected to a corresponding lighting connector of a trailer, indicative of towing. In some embodiments a vehicle may be provided with a user-operated switch that may be used by a driver to provide an indication as to whether or not the vehicle 100 is towing. The switch may be provided specifically for the purpose of allowing a driver to indicate whether the vehicle 100 is towing. Other arrangements are also useful.

It is to be understood that the VCU 10 includes a microprocessor is arranged to execute computer program code. The LSSA function is implemented in computer program code stored in a solid state memory of the VCU 10.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. A controller for a motor vehicle comprising:
   an input for receiving a signal indicative of a steering angle of a vehicle; and
   an output for outputting a signal to cause application of negative torque to one or more wheels of the vehicle to slow a wheel,
   the controller being configured to perform a turn-assist operation in which the controller causes application of negative torque to at least a first wheel of the vehicle being an inside trailing wheel when a steering angle exceeds a predetermined steering angle thereby to promote turning of the vehicle, the amount of negative torque being arranged to increase with increasing steering angle beyond the predetermined steering angle, wherein the predetermined steering angle is within a range of 60-85% of a maximum steering angle,
   the controller being further configured to cause an application of positive drive torque to one or more wheels of the vehicle, the controller being configured to cause an increase in an amount of net torque applied to at least a second wheel of the vehicle to compensate for the application of negative torque to at least the first wheel when the turn-assist operation is in progress.

2. A controller according to claim 1 further comprising an input for receiving a signal indicative of a speed of a vehicle, the controller being configured to adjust the amount of negative torque applied to said at least a first wheel in dependence on vehicle speed when a turn-assist operation is in progress.

3. A controller according to claim 2 configured to reduce the amount of negative torque applied to said at least a first wheel as vehicle speed increases when a turn-assist operation is in progress.

4. A controller according to claim 3 configured not to perform a turn-assist operation when vehicle speed is less than a lower threshold predetermined speed or when vehicle speed is greater than an upper threshold predetermined speed.

5. A controller according to claim 1 arranged to receive a signal indicative of driver demanded torque, the controller being configured to adjust the amount of negative torque applied to said at least a first wheel in dependence on driver demanded torque when a turn-assist operation is in progress.

6. A controller according to claim 5 configured to reduce the amount of negative torque applied to said at least a first wheel being an inside wheel as driver demanded torque increases when a turn-assist operation is in progress.

7. A controller according to claim 5 configured not to perform a turn-assist operation when driver torque demand is less than a predetermined lower threshold torque demand value or when driver torque demand is greater than a predetermined upper threshold torque demand value.

8. A controller according to claim 1 configured to allow a turn-assist operation to be performed in dependence on a user-selection signal created in response to user selection of a turn-assist mode of operation.

9. A controller according to claim 1, the controller being configured to determine a control mode in which a vehicle is operating.

10. A controller according to claim 9 configured, in dependence on the control mode in which a vehicle is operating, to set at least one of:
    a predetermined steering angle
    a predetermined lower threshold speed;
    a predetermined upper threshold speed;
    a predetermined lower threshold torque demand value;
    a predetermined upper threshold torque demand value.

11. A controller according to claim 1 configured to receive information indicative of a surface coefficient of friction between a driving surface and one or more wheels, the controller being configured to set an upper limit negative_torque_lim to the magnitude of the amount of negative torque that may be applied to an inside trailing wheel as a consequence of a turn-assist operation is being performed in dependence on the information.

12. A controller according to claim 11 configured wherein the upper limit negative_torque_lim is an upper limit to a total amount of negative torque that may be applied to an inside trailing wheel when a turn-assist operation is performed.

13. A-controller according to claim 11 configured wherein the upper limit negative_torque_lim is an upper limit of an amount of negative torque that is in addition to any negative torque applied other than as part of a turn-assist operation.

14. A controller according to claim 1 wherein the signal that causes application of negative torque to one or more wheels of a vehicle to slow a wheel comprises a signal that causes a braking system to apply negative torque to one or more wheels.

15. A controller according to claim 1 comprising a data processing apparatus, the data processing apparatus being configured to receive the signal indicative of a steering angle of a vehicle, the data processing apparatus being further configured to cause the application of negative torque to one or more wheels.

16. A controller according to claim 1 comprising a speed control system operable to cause a vehicle to operate in accordance with a target speed value by controlling an amount of brake torque applied by a braking system and an amount of drive torque applied by a powertrain to one or more wheels of the vehicle.

17. A motor vehicle comprising a controller according to claim 1.

18. A controller according to claim 1 wherein causing an increase in an amount of net torque applied to at least a second wheel of a vehicle to compensate for application of negative torque to at least a first wheel comprises adding an amount of torque to the net torque of the vehicle that corresponds to the amount of negative torque applied by the system.

19. A method of controlling a motor vehicle implemented by a controller comprising:
    receiving a signal indicative of a steering angle of a vehicle;
    performing a turn-assist operation, performing a turn-assist operation comprising causing application of negative torque to at least a first wheel of the vehicle being an inside trailing wheel when a steering angle exceeds a predetermined steering angle thereby to promote turning of the vehicle, the method comprising increasing the amount of brake torque with increasing steering angle beyond the predetermined steering angle, wherein the predetermined steering angle is within a range of 60-85% of a maximum steering angle;

applying positive drive torque to one or more wheels of the vehicle; and increasing an amount of net torque applied to at least a second wheel of the vehicle to compensate for the application of negative torque to said at least a first wheel when a turn-assist operation is in progress.

20. A method according to claim 19 further comprising:
receiving a signal indicative of a speed of a vehicle; and
reducing the amount of negative torque applied to said at least a first wheel as said vehicle speed increases when a turn-assist operation is in progress.

21. A method according to claim 19 further comprising:
receiving a signal indicative of driver demanded torque; and
reducing the amount of negative torque applied to said at least a first wheel as driver demanded torque increases, when a turn-assist operation is in progress.

22. A method according to claim 19 further comprising determining a control mode in which a vehicle is operating, and in dependence thereon setting at least one of:
a predetermined steering angle
a predetermined lower threshold speed;
a predetermined upper threshold speed;
a predetermined lower threshold torque demand value;
a predetermined upper threshold torque demand value.

23. A method according to claim 19 comprising:
receiving information indicative of a surface coefficient of friction between a driving surface and one or more wheels; and
setting an upper limit negative_torque_lim to the magnitude of the amount of negative torque that may be applied to an inside trailing wheel as a consequence of a turn-assist operation is being performed in dependence on the information.

24. A method according to claim 23 comprising setting the upper limit negative _torque _lim as the limit to the total amount of negative torque that may be applied to an inside trailing wheel when a turn-assist operation is performed.

25. A method according to claim 23 comprising setting the upper limit negative_torque_lim as the limit of the amount of negative torque that may be applied that is in addition to any negative torque applied other than as part of a turn-assist operation.

26. A method according to claim 19 wherein increasing an amount of net torque applied to at least a second wheel of a vehicle to compensate for application of negative torque to at least a first wheel comprises adding an amount of torque to the net torque of the vehicle that corresponds to the amount of negative torque applied by the system.

* * * * *